US012593271B2

(12) United States Patent
Diao et al.

(10) Patent No.: US 12,593,271 B2
(45) Date of Patent: Mar. 31, 2026

(54) CONFIGURATION INFORMATION EXCHANGE IN AN INTEGRATED ACCESS AND BACKHAUL NETWORK

(71) Applicant: ZTE Corporation, Shenzhen (CN)

(72) Inventors: Xueying Diao, Shenzhen (CN); Ying Huang, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 475 days.

(21) Appl. No.: 18/151,708

(22) Filed: Jan. 9, 2023

(65) Prior Publication Data

US 2023/0164684 A1      May 25, 2023

Related U.S. Application Data

(63) Continuation of application No. PCT/CN2020/105700, filed on Jul. 30, 2020.

(51) Int. Cl.
| | |
|---|---|
| *H04W 48/18* | (2009.01) |
| *H04W 36/00* | (2009.01) |
| *H04W 84/04* | (2009.01) |

(52) U.S. Cl.
CPC ..... *H04W 48/18* (2013.01); *H04W 36/00835* (2018.08); *H04W 84/042* (2013.01)

(58) Field of Classification Search
CPC ........... H04W 48/18; H04W 36/00835; H04W 84/042; H04W 8/24; H04W 84/047; H04W 48/12; H04W 88/085; H04W 92/20; H04W 8/26; H04W 28/06; H04W 56/0015; Y02D 30/70
See application file for complete search history.

(56) References Cited

U.S. PATENT DOCUMENTS

| | | | |
|---|---|---|---|
| 2006/0166694 A1 | 7/2006 | Jeong et al. | |
| 2014/0370894 A1* | 12/2014 | Hosdurg | ......... H04W 36/00835 |
| | | | 455/436 |
| 2015/0172965 A1* | 6/2015 | Jeong | .................... H04W 72/51 |
| | | | 370/331 |
| 2019/0380087 A1* | 12/2019 | Park | ...................... H04W 72/29 |

(Continued)

FOREIGN PATENT DOCUMENTS

| | | |
|---|---|---|
| CN | 103379579 A | 10/2013 |
| CN | 109257212 A | 1/2019 |

(Continued)

OTHER PUBLICATIONS

Partial Supplementary European Search Report for European Patent Application No. 20947381.8, mailed Jun. 20, 2023 (18 pages).

(Continued)

*Primary Examiner* — Marcus Hammonds
(74) *Attorney, Agent, or Firm* — Perkins Coie

(57) ABSTRACT

Methods, systems, apparatus for implementation in an integrated access and backhaul network (IAB) are described. One example method for wireless communication includes transmitting, by a first network node connected to one or more second network nodes by one or more first wireless links, a system information message on a second wireless link, the system information message indicating all public land mobile networks to which the one or more second network nodes provide connectivity.

12 Claims, 14 Drawing Sheets

(56)                    References Cited

U.S. PATENT DOCUMENTS

| 2019/0380128 | A1* | 12/2019 | Park | H04W 72/21 |
|---|---|---|---|---|
| 2020/0092939 | A1 | 3/2020 | Kim et al. | |
| 2020/0196225 | A1* | 6/2020 | Wang | H04W 76/11 |

FOREIGN PATENT DOCUMENTS

| CN | 110621050 A | 12/2019 |
|---|---|---|
| CN | 110958642 A | 4/2020 |
| CN | 111436049 A | 7/2020 |
| KR | 10-2015-0020316 A | 2/2015 |

OTHER PUBLICATIONS

Huawei et al., "Cell (re)Selection and Access Control and Connection Establishment," 3GPP TSG-RAN WG2 Meeting#107bis, R2-1912376, Chongqing, China, Oct. 14-18, 2019 (5 pages).
Qualcomm Inc et al., "Support for IAB in EPS," 3GPP TSG-SA WG2 Meeting #135, S2-1910282, Split Croatia, Oct. 14-18, 2019 (11 pages).
International Search Report and Written Opinion for International Application No. PCT/CN2020/105700, mailed on Apr. 29, 2021 (9 pages).
Office Action from Korean Patent Application No. 10-2023-7001303 mailed Jun. 15, 2025 with English summary, 9 pages.

* cited by examiner

600

602 transmitting, by a first network node connected to one or more second network nodes by one or more first links, a system information message on a second link, the system information message indicating all public land mobile networks to which the one or more second network nodes provide connectivity

610

612 transmitting, by a first network node over a wireless link to a second network node, a first message indicating that the first network node is capable of a radio access network sharing feature

620

622 receiving, by a second network node from a first network node, a message on a wireless link, the message indicating that the first network is capable of a radio access network sharing feature

624 transmitting, based on information received from the first network node, a message to the first network node about an integrated access and backhaul operation

630

632 transmitting, by a first network node to one of a number of second network nodes having wired connection accesses to a core network or internet, information about a capability that the first wireless node supports sharing by connecting to more than one second network nodes and a list of public land mobile networks supported by the first network node.

640

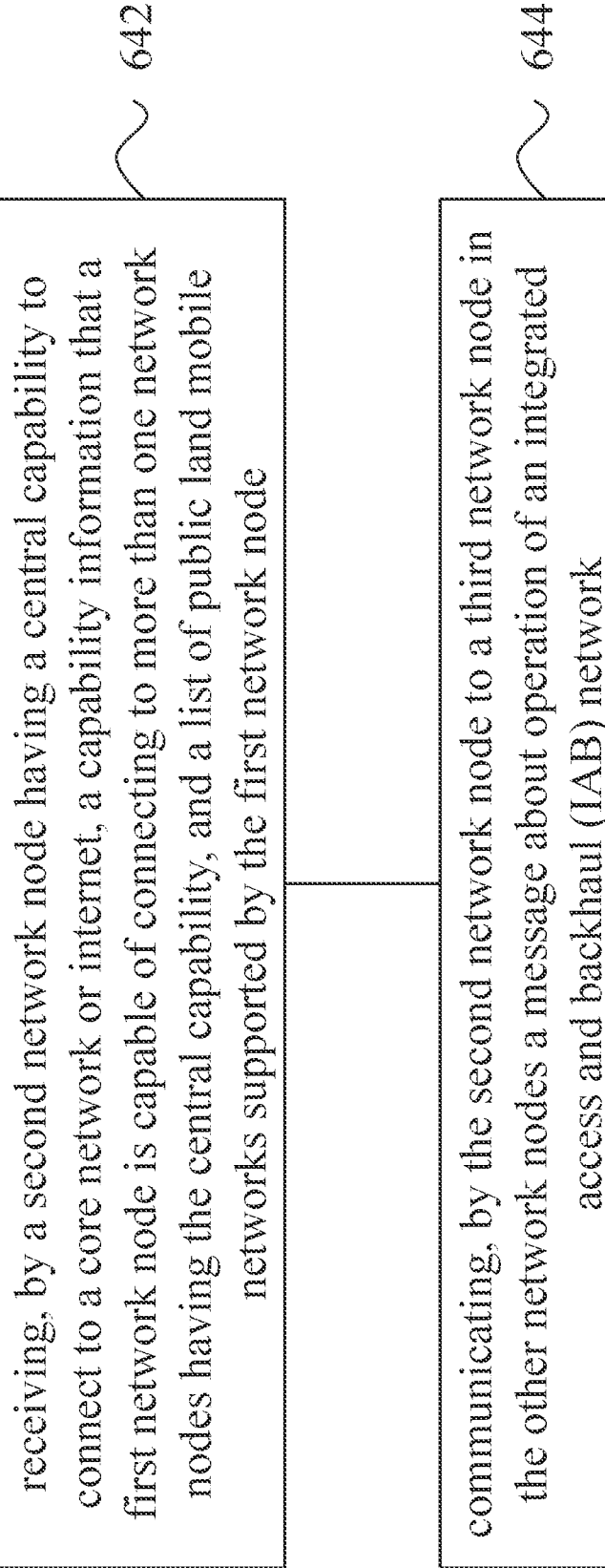

receiving, by a second network node having a central capability to connect to a core network or internet, a capability information that a first network node is capable of connecting to more than one network nodes having the central capability, and a list of public land mobile networks supported by the first network node

642 communicating, by the second network node to a third network node in the other network nodes a message about operation of an integrated access and backhaul (IAB) network

650 receiving, by a third network node from a second network node a message about an integrated access and backhaul (IAB) functionality of a first network node

652 providing, based on the message, the IAB functionality to the first network node

654

660 receiving, by a first network node configured as an integrated access and backhaul (IAB) node in an IAB network, an input packet on a first channel
410 transmitting, by the first network node, an output packet based on the input packet on a second channel to a second network node that is operating as a central unit (CU) in the IAB network
420

670

672 operating a network node in an integrated access and backhaul (IAB) network by providing a two-way communication between an IAB node and an IAB donor central unit (CU),

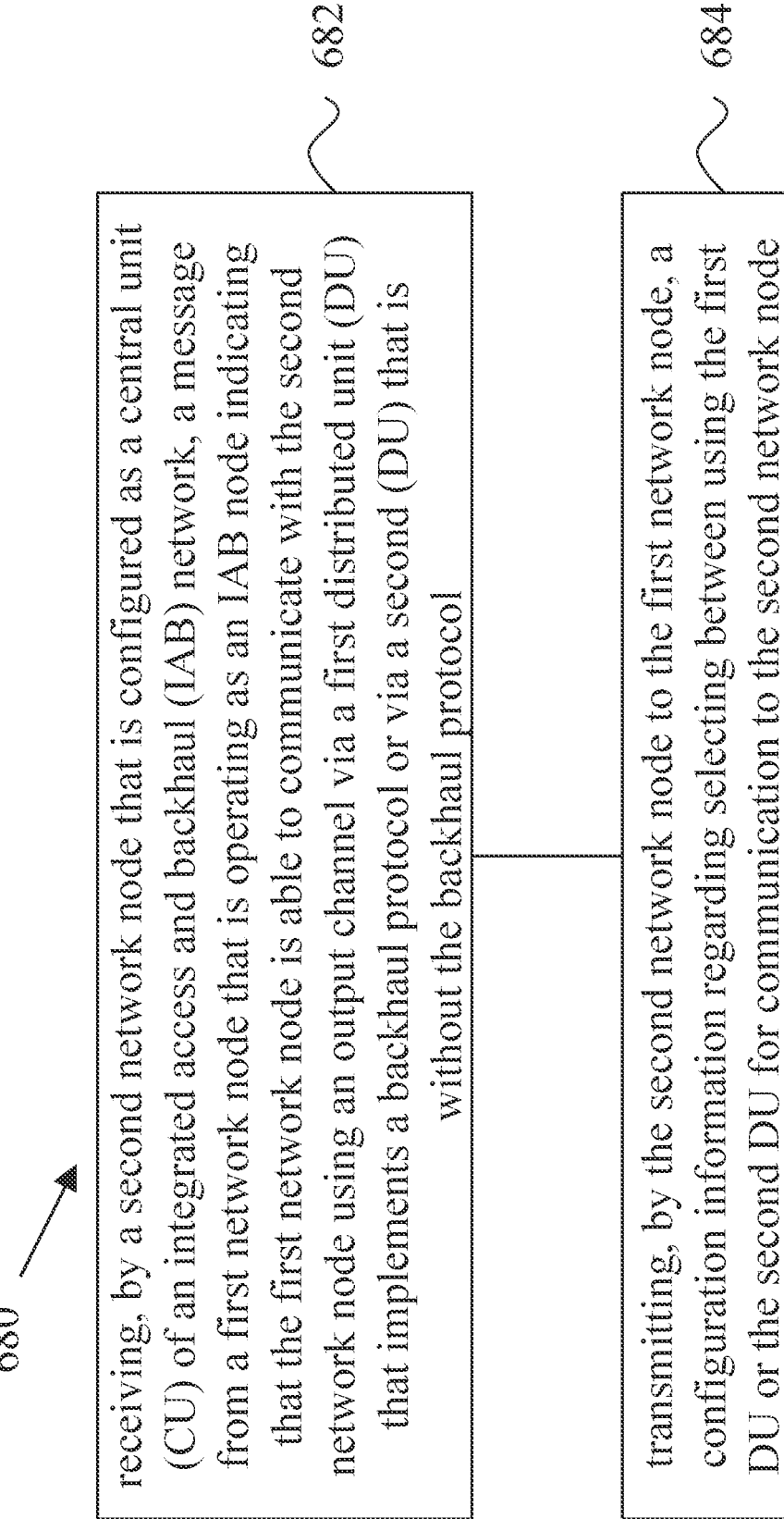

680

682 receiving, by a second network node that is configured as a central unit (CU) of an integrated access and backhaul (IAB) network, a message from a first network node that is operating as an IAB node indicating that the first network node is able to communicate with the second network node using an output channel via a first distributed unit (DU) that implements a backhaul protocol or via a second (DU) that is without the backhaul protocol

684 transmitting, by the second network node to the first network node, a configuration information regarding selecting between using the first DU or the second DU for communication to the second network node

FIG. 6I

CONFIGURATION INFORMATION EXCHANGE IN AN INTEGRATED ACCESS AND BACKHAUL NETWORK

CROSS REFERENCE TO RELATED APPLICATIONS

This patent document is a continuation of and claims benefit of priority to International Patent Application No. PCT/CN2020/105700, filed on Jul. 30, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an integrated access and backhaul network.

SUMMARY

This document relates to methods, systems, and devices in integrated access and backhaul (IAB) networks in mobile communication technology, including 5th Generation (5G) and New Radio (NR) communication systems.

In one example aspect, a method of wireless communication is disclosed. The method includes transmitting, by a first network node connected to one or more second network nodes by one or more first links, a system information message on a second link, the system information message indicating all public land mobile networks to which the one or more second network nodes provide connectivity.

In another example aspect, another method of wireless communication is disclosed. The method includes transmitting, by a first network node over a wireless link to a second network node, a first message indicating that the first network node is capable of a radio access network sharing feature.

In another example aspect, another method of wireless communication is disclosed. The method includes receiving, by a second network node from a first network node, a message on a wireless link, the message indicating that the first network is capable of a radio access network sharing feature; and transmitting, based on information received from the first network node, a message to the first network node about an integrated access and backhaul operation.

In another example aspect, another method of wireless communication is disclosed. The method includes transmitting, by a first network node to one of a number of second network nodes having wired connection accesses to a core network or internet, information about a capability that the first wireless node supports RAN sharing by connecting to more than one second network nodes and a list of public land mobile networks supported by the first network node.

In another example aspect, another method of wireless communication is disclosed. The method includes receiving, by a second network node having a central capability to connect to a core network or internet, a capability information that a first network node is capable of connecting to other network nodes having the central capability, and a list of public land mobile networks supported by the first network node and communicating, by the second network node to a third network node in the other network nodes a message about operation of an integrated access and backhaul (IAB) network.

In another example aspect, another method of wireless communication is disclosed. The method includes receiving, by a third network node from a second network node, a message about an integrated access and backhaul (IAB) functionality of a first network node. The message may be used for further operation by the third network node.

In another example aspect, another method of wireless communication is disclosed. The method includes receiving, by a first network node configured as an integrated access and backhaul (IAB) node in an IAB network, an input packet on a first channel; and transmitting, by the first network node, an output packet based on the input packet on a second channel to a second network node that is operating as a central unit (CU) in the IAB network.

In another example aspect, another method of wireless communication is disclosed. The method includes operating a network node in an integrated access and backhaul (IAB) network by providing a two-way communication between an IAB node and an IAB donor central unit (CU). Here, the network node receives a first encapsulated F1-C traffic from the IAB node as a radio resource control (RRC) message and forwards to the IAB donor CU as a first F1AP message. The network node receives a second F1AP message from the IAB donor CU and forwards to the IAB node as a second RRC message.

In another example aspect, another method of wireless communication is disclosed. The method includes receiving, by a second network node that is configured as a central unit (CU) of an integrated access and backhaul (IAB) network, a message from a first network node that is operating as an IAB node indicating that the first network node is able to communicate with the second network node using an output channel via a first distributed unit (DU) that implements a backhaul protocol or via a second (DU) that is without the backhaul protocol; and transmitting, by the second network node to the first network node, a configuration information regarding how to select the output channel.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 6A to 6I show an example of a method for wireless communication.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

The following abbreviations are used in the present document.

Figure 1:
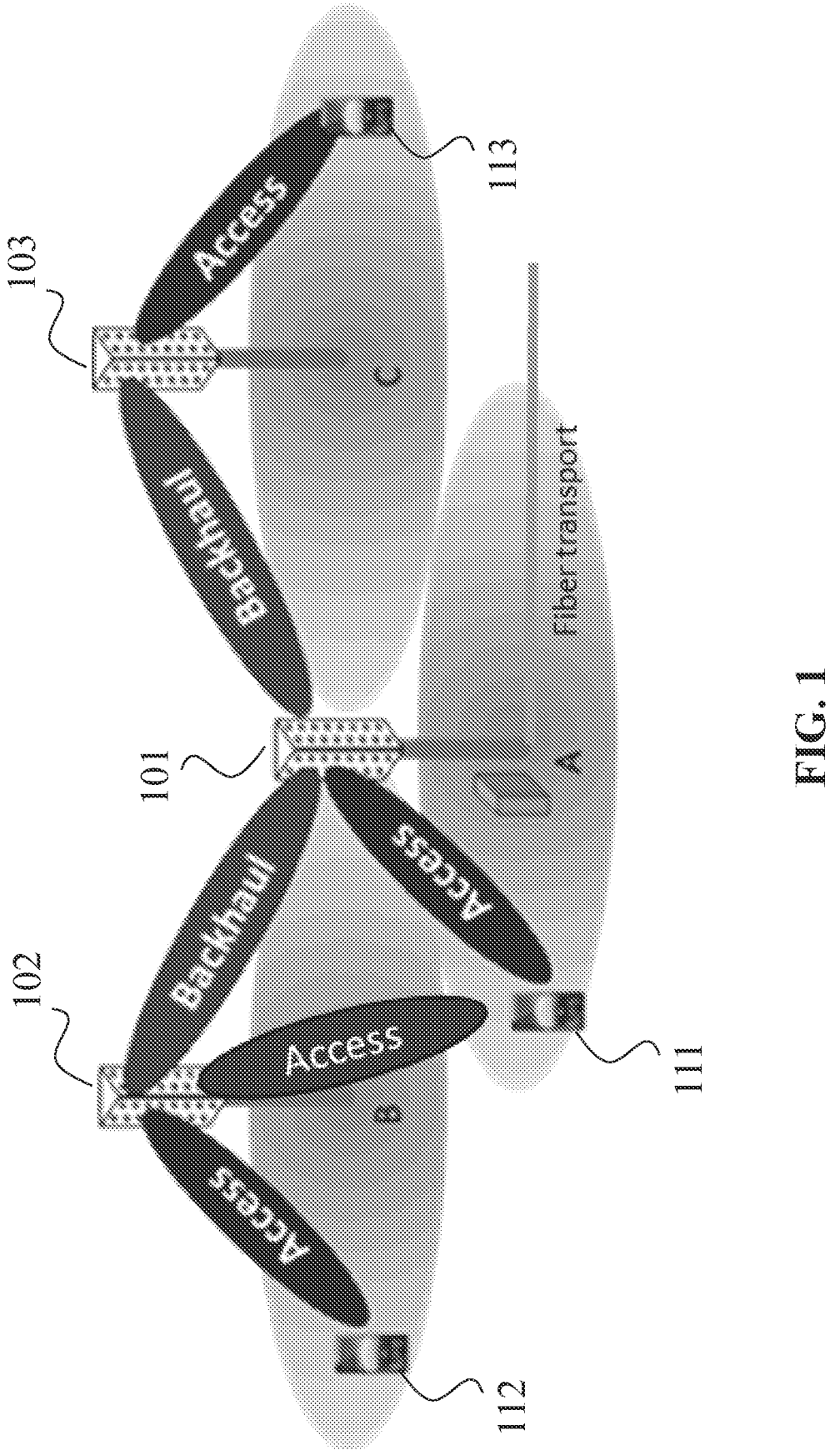
FIG. 1 shows an example of an IAB network.

3GPP—Third Generation Partnership Project
5G—Fifth Generation wireless protocol specified by 3GPP
AMF—Access and Mobility Function
AP—Application Protocol
BAP—Backhaul Access Protocol
BH—backhaul
CP—Control Plane
CU—Central Unit
DRB—Data Radio Bearer
DS—Differentiated Service
DSCP—Differentiated Services Code Point
DU—Distributed Unit
EN-DC—E-UTRAN New Radio
E-UTRAN—Evolved Universal Terrestrial Radio Access Network
F1—Interface for communication between a gNB DU and a gNB CU
gNB—gNodeB
IAB—Integrated Access and Backhaul
ID—Identifier
IP—Internet Protocol
IPSec—Internet Protocol Security
LTE—Long Term Evolution wireless standard
MAC—Medium Access Control
MCG—Master Cell Group
MIMO—multi-input multi-output
MT—Mobile Termination
NDS—Network Domain Security
NR—New Radio standard specified by 3GPP
OAM—Operation Administration and Maintenance
PDCP—Packet Data Convergence Protocol
PDU—Protocol Data Unit
PHY—Physical Layer
PLMN—Public Land Mobile Network
RAN—Radio Access Network
RLC—Radio Link Control
RRC—Radio Resource Control
SCG—Secondary Cell Group
SDAP—Service Data Adaptation Protocol
SRB—Signaling Radio Bearer
STC—Synchronization Signal Block Transmission Configuration
UE—User Equipment
UP—User Plane Compared with Long Term Evolution (LTE), a system based on the new radio (NR) specification may use a larger available bandwidth. The use of massive multi-input multi-output (MIMO) and multi-beam make it possible to implement integrated access and backhaul links (IAB). Through wireless backhaul links and relay links, dense NR cell networks can be deployed more flexibly without correspondingly increasing the dense deployment of transmission networks. An example of a network deployed with integrated access and backhaul links is shown in FIG. 1, where A, B, and C are all access nodes, and user equipment can access nodes A, B through the access link, C, but there is only a wired connection between the access node A and the core network, and the access nodes B and C have no wired connection with the core network element. Among them, the access node that supports the wireless access of the UE and transmits data wirelessly is called an IAB node (IAB node). The access node that provides the wireless backhaul function for the IAB node so that the UE connects to the core network is called an IAB donor (IAB donor). The data of the UE can be transmitted between the access nodes through the wireless backhaul link. For example, the access node B may send the data received from the UE to the access node A through a wireless backhaul link, and then the access node A sends the UE data to the core network element. For the downlink, the core network element can send the UE data packet to the access node A, and then the access node A sends the UE data to the access node B through the wireless backhaul link, and the access node B sends the UE through the access link The data is sent to the UE. Access link and backhaul link can use the same or different carrier frequencies. In addition, the data of the UE may need to be transmitted through the multi-hop relay backhaul link between the access node and the core network. In addition, supporting the separate deployment of CU/DU is an important technical feature in NR. Support IAB function in CU/DU separated deployment scenario.

The present document uses examples from the 3GPP New Radio (NR) network architecture and 5G protocol only to facilitate understanding and the disclosed techniques and embodiments may be practiced in other wireless systems that use different communication protocols than the 3GPP protocols.

Wireless backhaul links and relay links enable the flexible deployment of denser NR cell networks without the need to increase the dense deployment of conventional transmission network elements. FIG. 1 shows an example of a network with integrated access and backhaul (IAB) links. As shown therein, A (101), B (102) and C (103) are access nodes, user equipment (UEs 111, 112 and 113) can communicate with the access nodes A, B and C through access links. There is only a wired connection between access node A and the core network, but no wired connection between access nodes B and C and core network elements. An access node that supports wireless access of the UE and wirelessly transmits data is called an IAB node (e.g., 102 or 103), whereas an access node that provides a wireless backhaul function for the IAB node to enable the UE to connect to the core network is called an IAB donor (e.g., 101). Thus, the access nodes can transmit UE data through a wireless backhaul link.

In an example, the access node B may send data received from the UE to the access node A through a wireless backhaul link, and then the access node A sends the UE data to the core network element. For the downlink, the core network element can send the UE data packet to the access node A, and then the access node A sends the UE data to the access node B via the wireless backhaul link, and the access node B sends the UE data via the access link. In some embodiments, the access link and the backhaul link can use the same carrier frequency. In other embodiments, they may use different carrier frequencies. In some embodiments, UE data may need to be transmitted through a multi-hop relay backhaul link between the access node and the core network.

In some embodiments, an access node can include a Control Unit (CU) and one or more Distributed Unit(s) (DU(s)). In an example, the CU is a logical node hosting radio resource control (RRC), service data adaptation protocol (SDAP) and packet data convergence protocol (PDCP) of the access node that controls the operation of one or more DUs. The DU is a logical node hosting radio link control (RLC), medium access control (MAC) and physical (PHY) layers of the access node. The CU and the DU(s) it controls are connected via the F1 interface. The F1 application protocol (F1-AP) is used for conveying the lower-layer configuration information of the radio bearers between the CU and DU, as well as the setting up of a GTP tunnel between the DU and CU for each radio bearer. The CU/DU separation, which is supported in NR, is also supported in IAB deployments.

In the future, it may be possible that IAB capable devices or network nodes may be deployed in wireless networks along with devices that do not implement the IAB functionality. For example, LTE and current 5G base stations may not implement a backhaul access protocol (BAP) that specifies data format used on a backhaul link. Furthermore, even among network nodes that implement the IAB functionality, several technical problems exist. The present document provides technical solutions that can be used in embodiments of IAB networks that use IAB enabled network nodes or IAB networks that include non-IAB capable nodes also. Furthermore, some embodiments may enable sharing of multiple radio access networks (RAN). Some embodiments may be used for implementing Control Plane (CP) and User Plane (UP) separation in IAB networks.

Example Embodiment 1

In this embodiment, one IAB-DU may connect to only one donor-CU.

When an IAB-node integrates into the IAB network, it may first select a parent-node to connect to. If the IAB-node supports sharing among different public land mobile networks (PLMNs), the CU that is finally accessed by the IAB-node to should support RAN sharing as well. Moreover, the PLMNs supported by the CU should cover the set of PLMNs supported by the IAB-node. If the IAB-node performs a parent-node selection only based on the received system information block SIB1 information, it may connect to a CU not supporting RAN sharing or a CU not supporting the PLMNs supported by the IAB-node. In this case, the following operations may be performed:

1. IAB-node selects an IAB-capable parent-node to access, then CU hands over the IAB-node to a suitable target CU.
2. The system information broadcast by the parent-node includes the PLMN IDs supported by all the donor-CUs that the parent-node connects to.

The CU may need to know whether the IAB-node supports sharing among different PLMNs. Therefore, the IAB-MT may send to the CU the following information. This information may be sent via a higher layer message such as via a radio resource control RRC message:

An indication that whether the IAB-node supports RAN sharing;
the supported PLMN IDs, if any,
the PLMN ID and AMF ID of the registered AMFs.

The PLMN IDs supported by CU are sent to the parent-node via an RRC message or an F1 application protocol F1AP message.

For RAN sharing, in some embodiments, the F1 messages belonging to different PLMNs may be transmitted via the same transport network. In some embodiments, the F1 messages belonging to different PLMNs may be transmitted via different transport networks. The internet protocol IP address of the packet encapsulating the traffic belonging to PLMN 1 may be PLMN 1's IP address. Therefore, the IP address requested by the IAB-MT may be per-PLMN, which means IAB-MT may send the supported PLMN list to the CU. This list may be sent via an RRC message. For each PLMN, the IAB-MT informs CU of the requested number of IP addresses, the version of IP address (e.g., v4 or v6), and the usage of the IP address.

If the donor-DU is responsible for IP address allocation, the CU sends the following information to donor-DU via an F1AP message.

In some embodiments, the CU may send to the donor-DU the PLMN list supported by IAB-DU.

In some embodiments, the IP address requested by CU is per-PLMN.

Example Embodiment 2

This embodiment focuses on one IAB-DU connects to more than one donor-CUs. In the following, the case that IAB-DU connects to two donor-CUs is described as an example, where CU1 is the master CU, and CU2 is the secondary CU.

When integrating into the network, the IAB-MT may first perform parent-node selection. The following parent-node selection solutions can be considered:

Solution 1: IAB-node is pre-configured a parent-node list, and then it selects a parent-node from the list.
Solution 2: IAB-node is configured a parent-node list by OAM, and then it selects a parent-node from the list.
Solution 3: Based on the SIB info, the SIB info includes the PLMN list supported by the donor-CU.

After selecting a suitable parent-node 1, IAB-MT will establish RRC connection with CU 1.

IAB-MT may inform the CU1 that it supports, or has the capability of, sharing by connecting to different donor-CUs and the PLMN list supported by the IAB-MT. Then, CU1 may configure the IAB-MT part with a measurement configuration in order to perform discovery, measurement and measurement reporting of candidate gNBs. After receiving a measurement report, CU1 may select a CU2 for IAB-MT, and then performs SgNB addition procedure. CU1 sends an IAB-node indication to CU2 via Xn interface. Finally, IAB-MT connects to CU2.

Regarding F1-C traffic delivery, the following options can be considered.

Option 1: IAB-DU sends F1-C traffic to CU1 via parent-node 1, and sends F1-C traffic to CU2 via parent-node 2.

Option 2: IAB-DU sends F1-C traffic to CU1/CU2 via parent-node 1. To be specific, the F1-C traffic to be sent to CU2 is contained in an FLAP message, and the F1AP message is decodes by CU1. When CU1 receives an F1AP message which includes an F1-C Traffic Container, it sends the F1-C Traffic Container to CU2 via Xn interface. Correspondingly, CU2 includes the F1-C Traffic into a container and sends the F1-C traffic container to CU1 via Xn interface, and then CU1 sends the received F1-C traffic container to IAB-DU via an F1AP message. In this way, IAB-DU can receive the F1-C traffic generated by CU2.

CU1 and CU2 exchange the capability that F1-C traffic can be delivered via Xn interface.

IAB-node reports CU1 whether it supports option 2 via RRC message.

For the F1-C traffic from/to CU2, it is up to CU1 to decide to configure IAB-node with option 1 and/or option 2. When both options are configured, it is up to IAB-node implementation to select a way for F1-C traffic transfer. The configuration may be performed before IAB-DU part setup. IAB-donor-CU may also change the configuration after IAB-DU part setup.

Regarding IAB STC Info configuration, if the following cases occur, mechanisms to avoid configuration conflict needs to be considered.

Case 1: IAB-DU only sends IAB STC info to CU1. In this case, CU1 should send the IAB STC to CU2.

Case 2: IAB-DU sends IAB STC info to both CU1 and CU2. CU1 and/or CU2 plan to modify IAB STC info.

For each shared cell, CU1/CU2 provides CU2/1 several candidate IAB STC configurations and the corresponding indexes via Xn interface. CU2/CU1 selects one of the IAB STC configuration from the candidates, and then sends the index corresponding to the selected IAB STC configuration to CU1/2 via Xn interface.

If IAB-DU does not send the IAB STC Info to the CU, it is up to the CU to determine the IAB STC configuration. Considering configuration conflict may occur, for each shared cell, CU1 provides CU2 several candidate IAB STC configurations and, optionally, the corresponding indexes via Xn interface. CU2 selects one IAB STC configuration from the candidates, and then sends the index corresponding to the selected IAB STC configuration to CU1 via Xn interface.

For IAB-DU resource configuration, considering configuration conflict may occur, for each shared cell, CU1 provides CU2 several candidate GNB-DU resource configurations and, optionally, the corresponding indexes via Xn interface. CU2 selects one GNB-DU resource configuration from the candidates, and then sends the selected resource configuration info or index corresponding to the selected resource configuration to CU1 via Xn interface.

CU2 can also send CU1 the configuration info, e.g. IAB STC info, resource configuration info, of all the cells served by CU2. In this case, CU2 does not send IAB STC info to IAB-DU, and does not generate GNB-DU RESOURCE CONFIGURATION message. This means that IAB-DU only receives IAB STC info and resource configuration from the message sent by CU1, and only response CU1 with GNB-DU RESOURCE CONFIGURATION ACKNOWL-EDGE message.

The above described method may also be implemented for a child-node.

Embodiment Example 3

This embodiment focuses on the IAB-node with frequency range 1, frequency range 2 dual connectivity, FR1/FR2 DC. To be specific, an IAB-node in NR-DC may be configured with an FR1 master cell group MCG provided by a non-backhaul access protocol (BAP) capable gNB DU and an FR2 SCG via a BAP-capable donor DU. An example is shown in FIG. 2.

Figure 2:
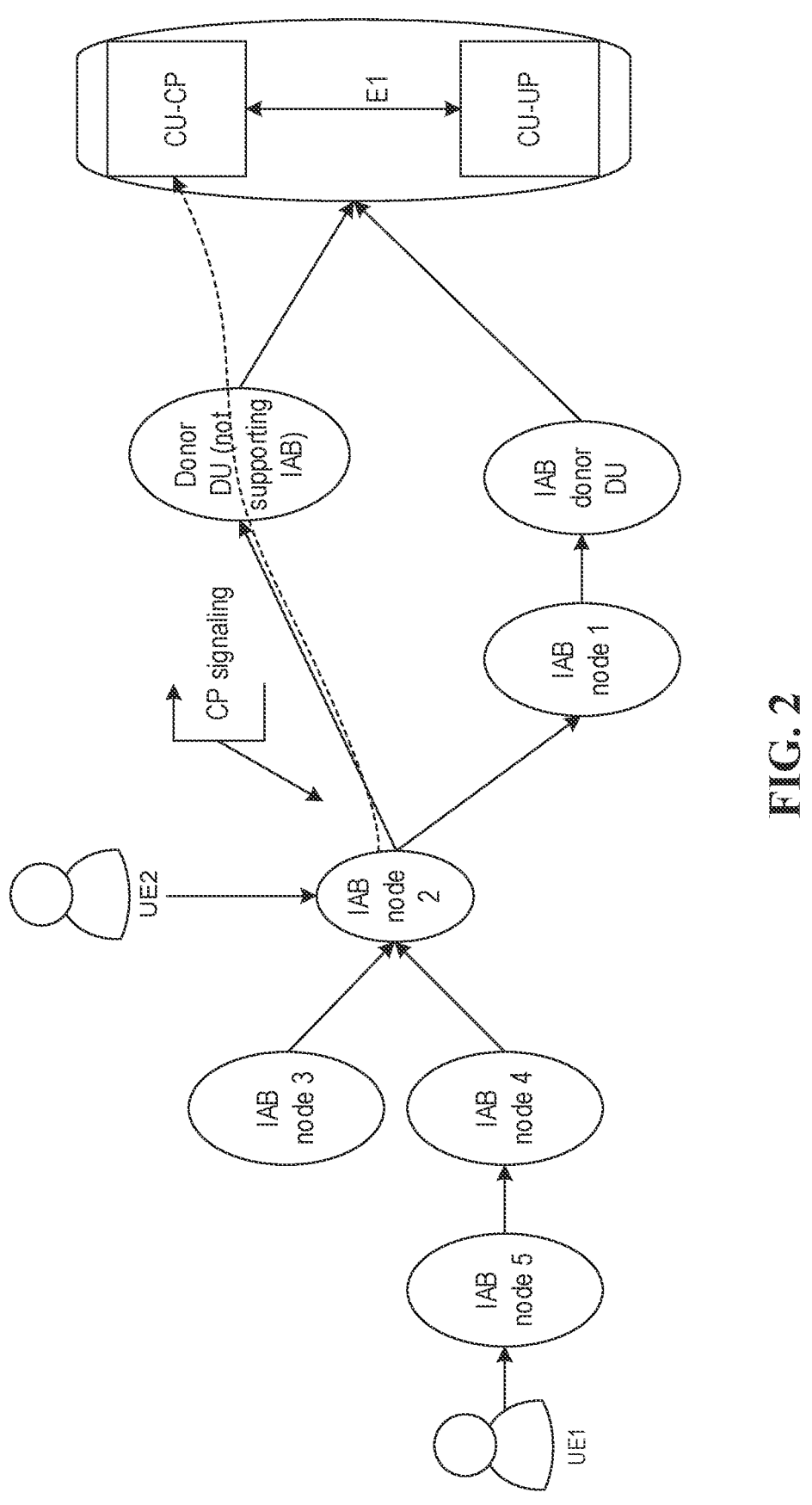
FIG. 2 shows an example of an IAB parent-node in an IAB network.

FIG. 2 shows an example of an IAB network in which an IAB-node (labeled IAB node 2) is operating as a parent node. From left to right in FIG. 2, UE1 is being served by IAB5, which is in communication with IAB node 2 via IAB node 4. Similarly, IAB node 3 communicates with IAB node 2. Another UE2 is directly provided connectivity by IAB node 2. Towards the core network, IAB node 2 has two possible channels by which it may be able to communicate with the CU. A first channel through IAB node 1, that connects to the CU through an IAB donor DU. The second channel corresponds to a Donor DU that does not support or implement the IAB protocol, which is also coupled with the CU.

IAB-node 2 can send/receive traffic to/from donor-CU via a non-BAP capable donor DU or a donor-DU. IAB-node 2 can report CU its capability information that whether the traffic can be delivered to CU via a non-BAP capable donor DU.

It is up to Donor-CU to decide to only configure FR1 leg, or only configure FR2 leg, or configure both FR1 leg and FR2 leg, for the traffic transfer. The configuration may be performed before IAB-DU part setup. IAB-donor-CU may also change the configuration after IAB-DU part setup. In case the configuration is not performed before IAB-DU part setup, the IAB node uses the FR2 leg as the default one. When both FR1 leg and FR2 leg are configured, it is up to IAB-node implementation to select a leg for traffic transfer.

Separate IP address pairs {IAB-DU's IP address, CU's IP address} should be used for FR1 leg and FR2 leg.

For the F1-C traffic generated by IAB-node 2, IAB node encapsulates the uplink F1-C traffic in NR RRC message, and transmits it to the non-BAP capable donor DU first. Then the non-BAP capable donor DU transmits the uplink F1-C traffic to IAB donor CU via UE associated F1AP message. For the downlink, IAB donor CU encapsulates the F1-C traffic in the FLAP message and transmits it to the non-BAP capable donor DU first. After receiving the F1AP message, the non-BAP capable donor DU transmits the contained F1-C traffic using NR RRC message to the IAB-MT.

Figure 3:
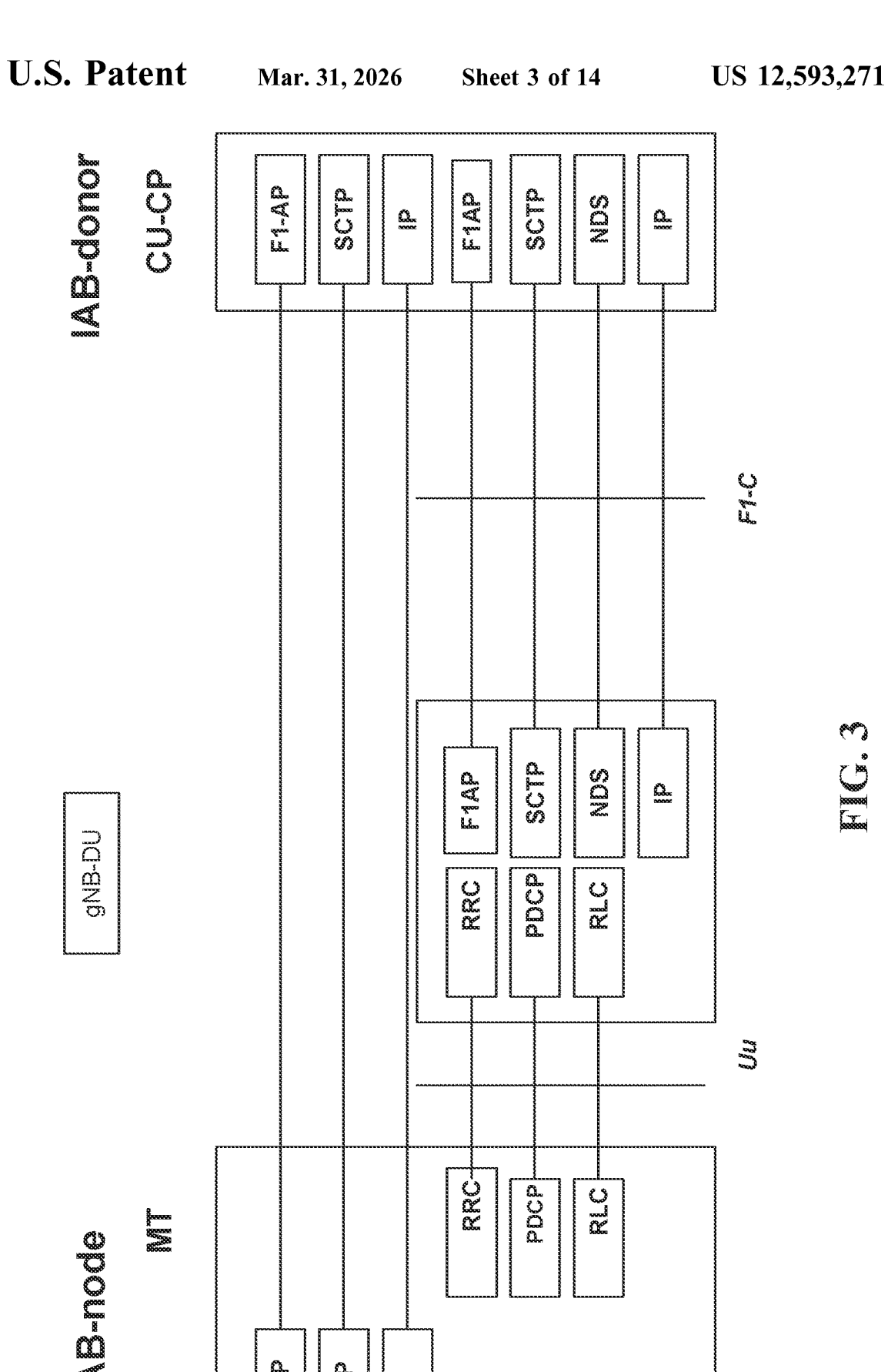
FIG. 3 shows a protocol stack implementation in a gNodeB in an IAB network.

FIG. 3 shows the protocol stack for F1-C between IAB-DU and the IAB-donor-CU-CP, when the F1-C traffic is transmitted via the non-BAP capable donor DU.

Due to the advantage that CP traffic is delivered via FR1 leg, the CP traffic generated by downstream nodes should be forwarded by IAB-node 2 via FR1 leg as well.

For the F1-C traffic forwarded by IAB-node 2, in R16 IAB, once receiving a BAP packet, IAB-node 2 shall read BAP header and confirm the egress node and egress BH RLC channel based on mapping configuration. However, there is only Signaling Radio Bearer (SRB) and Data Radio Bearer (DRB) between IAB-MT 2 and donor DU. So IAB-node 2 cannot determine which RLC entity the BAP PDU should be delivered to.

Figure 4:
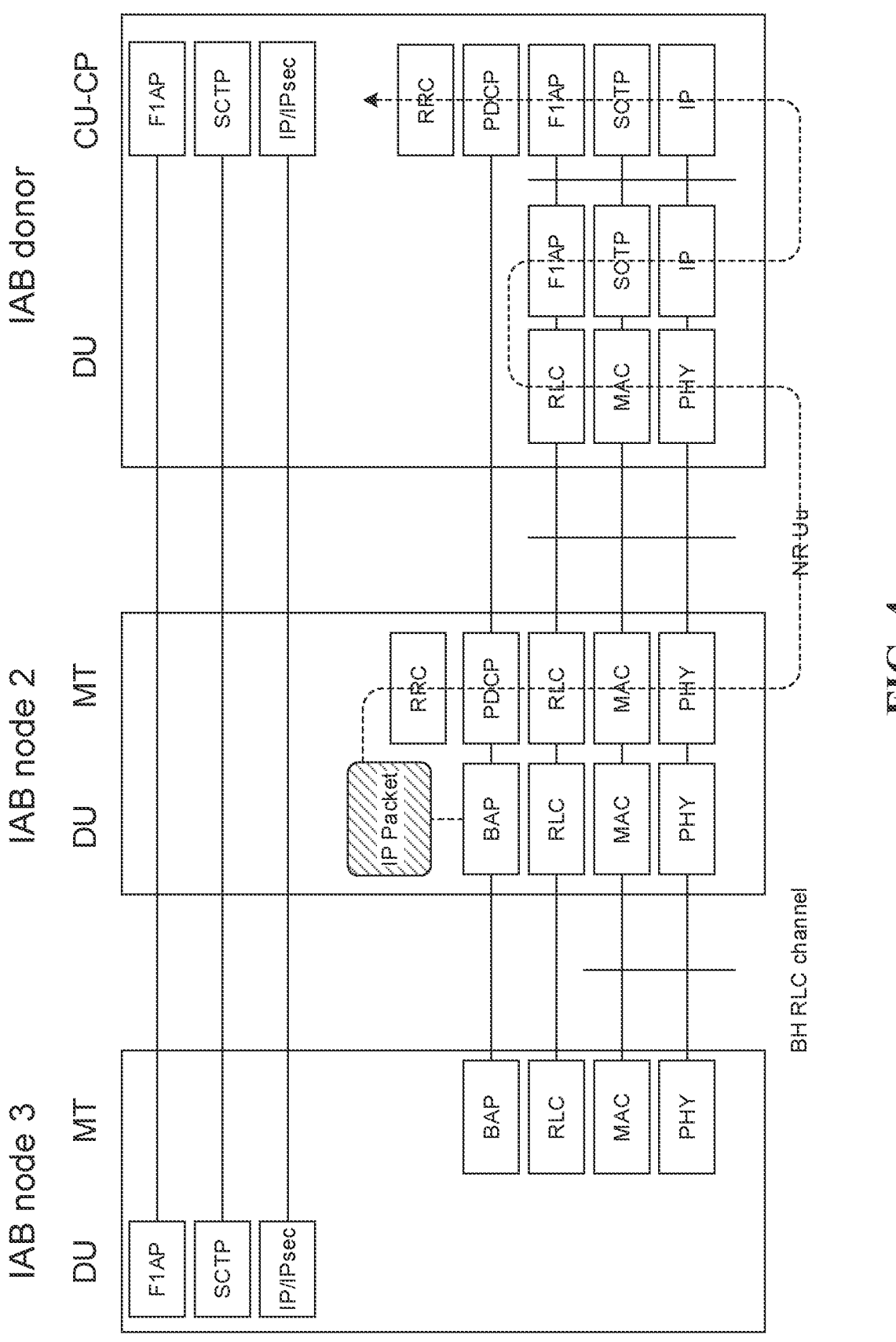
FIG. 4 shows an example of packet processing across a protocol stack in an IAB network.

To address this, IAB-node 2 decapsulates BAP packet and obtains an IP packet. Then it delivers the IP packet to RRC layer. The IP packet will be contained in a RRC message. IAB-MT submits the RRC message to lower layers for transmission. However, IAB-node 2 firstly needs to know whether it should decapsulate the BAP packet or not. The following solutions can be considered (with reference to FIG. 4):

1) Since IAB-DU knows the BH RLC channels used for CP signaling transfer. Upon receiving the UL packet from the BH RLC channel used for CP signaling delivery, IAB-DU decapsulates the BAP packet. This is only suitable for the case that all CP signaling is transmitted via FR1 leg.

2) The destination BAP address in the routing ID within the BAP header is equal to IAB-node 2 BAP address. This can implicitly indicate that IAB-node 2 should decapsulate the BAP packet.

3) Using 1 bit in BAP header to indicate the CP traffic transmission type. For example, in some embodiments a header value of "1" may indicate FR1 leg, and a header value of "0" may indicated FR2 leg. Once the CP traffic transmission type is set to 1, IAB-node 2 decapsulates the BAP packet.

In R16 EN-DC case, all the CP signaling is transmitted via SRB1. While in R17 IAB, the following options may be implemented.

Option 1: all the CP signaling is transmitted via SRB1.

Option 2: some CP signaling is transmitted via SRB1, while some is transmitted via SRB2. For example, the following embodiments may be used.

In some embodiments, SCTP related signaling/IPsec related signaling/non-UE associated signaling has higher priority than UE-associated signaling, so the BAP header may indicate that "CP traffic priority=xx".

In some embodiments, a packet with larger hop count is transmitted via SRB1, so BAP header may include a "hop count" that will help to make the decision about transmission.

Correspondingly, CU shall include the DL F1-C traffic into a RRC message, and sends it to IAB-node via FR1 leg. Upon receiving the RRC message, the IAB-MT shall forward the IP packet to the IAB-DU. The IAB-DU performs the traffic mapping from IP-layer to layer-2. The traffic mapping information is configured by the IAB-donor-CU via F1AP message, which contains the IP header information (e.g. IP address, flow label, DS/DSCP), and the BH information including the BAP routing ID and a list of egress link and BH RLC channel pairs.

The traffic mappings can be configured as part of the UE Context Setup or UE Context Modification procedures. They may also be configured via the non-UE-associated BAP Mapping Configuration procedure.

Figure 5:
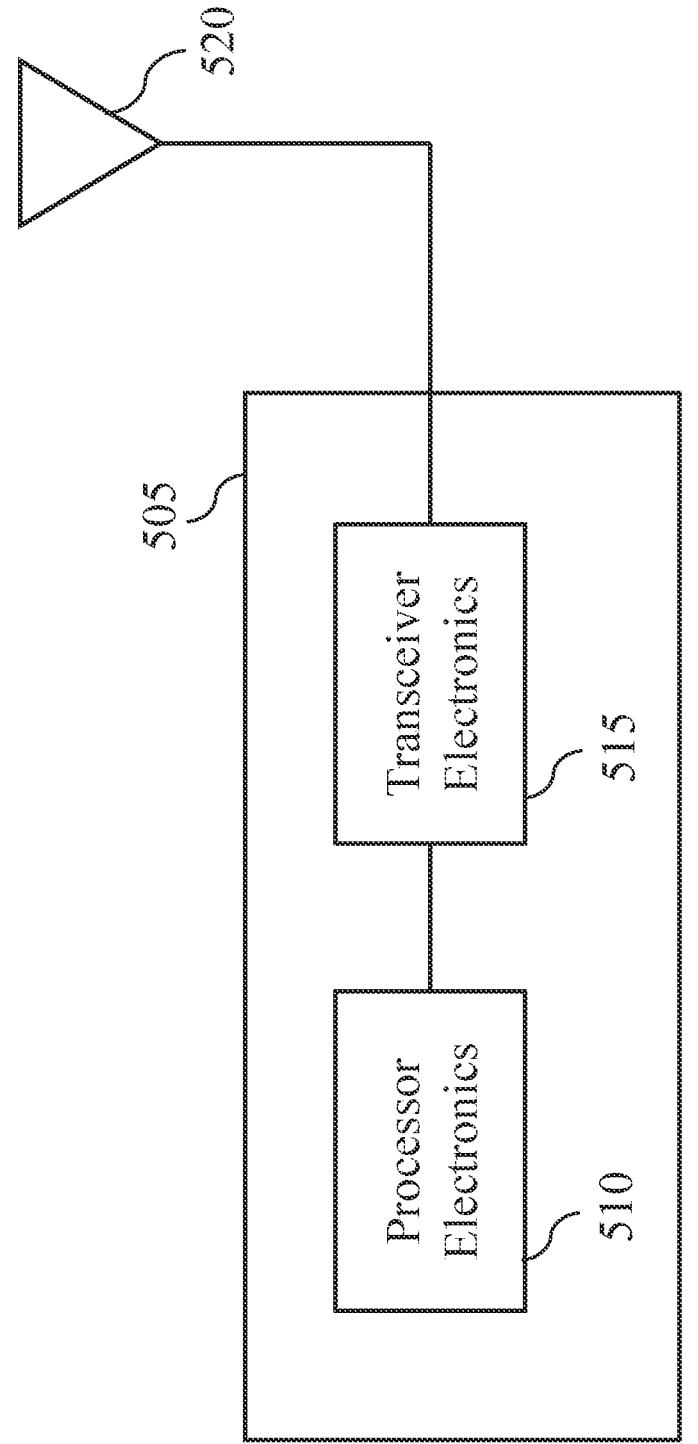
FIG. 5 is a block diagram representation of a portion of an apparatus that can be used to implement methods and techniques of the presently disclosed technology.

FIG. 5 is a block diagram representation of a portion of an apparatus, in accordance with some embodiments of the presently disclosed technology. An apparatus 505, such as a base station or a wireless device (or UE), can include processor electronics 510 such as a microprocessor that implements one or more of the techniques presented in this document. The apparatus 505 can include transceiver electronics 515 to send and/or receive wireless signals over one or more communication interfaces such as antenna(s) 520. The apparatus 505 can include other communication interfaces for transmitting and receiving data. Apparatus 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the apparatus 505. The network node functionalities described in the present document may be implemented using a hardware platform similar to the apparatus 505. In some cases, an IAB node may be configured with multiple antennas 520, separately for access and backhaul.

The technical solutions described herein can be further described using the following listing of solutions, which may be preferably implemented in some embodiments.

The following solutions may be implemented by an IAB-node, e.g., as described with respect to Example Embodiment 1.

Figure 6A:
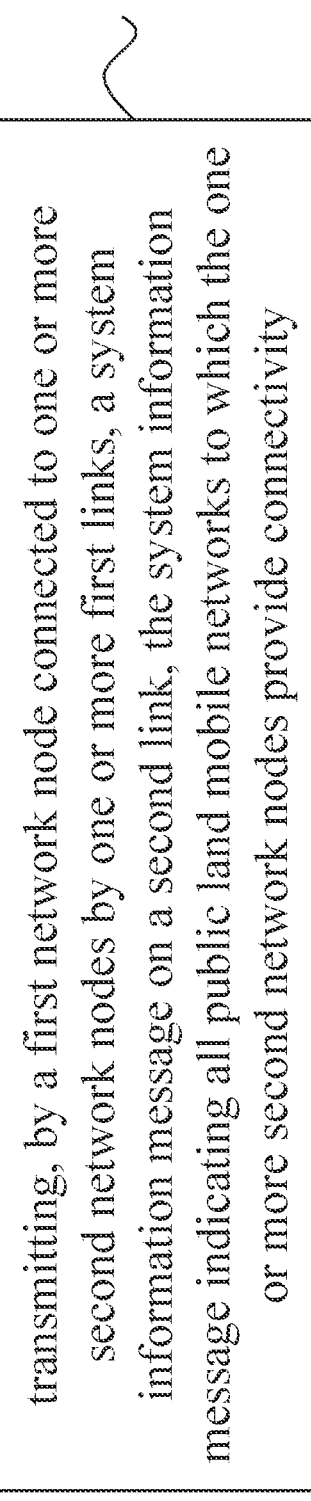

1. A method for wireless communication (e.g., method 600 depicted in FIG. 6A), comprising: transmitting (602), by a first network node connected to one or more second network nodes by one or more first links, a system information message on a second link, the system information message indicating all public land mobile networks to which the one or more second network nodes provide connectivity. The links may be wired links or wireless links.

For example, the first network node may be a parent IAB node and the one or more second network nodes may be IAB nodes that connect with the parent IAB node.

2. The method of solution 1, wherein the one or more first links operate in a backhaul frequency band or a suitable frequency band on a wired channel and wherein the second link operates in the backhaul frequency band or another wired channel.

3. The method of any of solutions 1-3, wherein the first network node is a parent integrated access and backhaul (IAB) node or an IAB donor distributed unit (DU).

The following solutions may be implemented by an IAB-node, e.g., as described with respect to Example Embodiment 1.

Figure 6B:
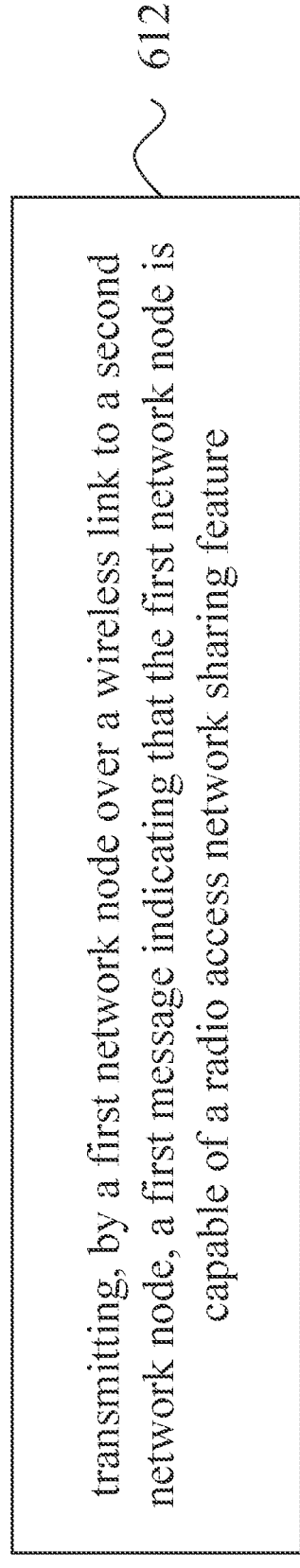

4. A method for wireless communication (e.g., method 610 depicted in FIG. 6B), comprising: transmitting (612), by a first network node over a wireless link to a second network node, a first message indicating that the first network node is capable of a radio access network sharing feature.

In this solution, the first network node may be operating as an IAB node and the second network node may be a CU.

5. The method of solution 4, wherein the first message identifies public land mobile networks (PLMNs) that the first network node is capable of supporting.

6. The method of any of solutions 4-5, including: receiving, by the first network node from the second network node, a second message indicative of public land mobile networks supported by the second network node.

7. The method of any of solutions 4-6, wherein the first message is a radio resource control (RRC) message.

8. The method of any of solutions 4-6, wherein the second message is an RRC message or an F1AP message.

9. The method of any of solutions 4-9, further including: requesting, by the first network node, an internet protocol (IP) address on a per-public land mobile network basis from the second network node.

The following solutions may be implemented by CU, e.g., as described with respect to Example Embodiment 1.

Figure 6C:
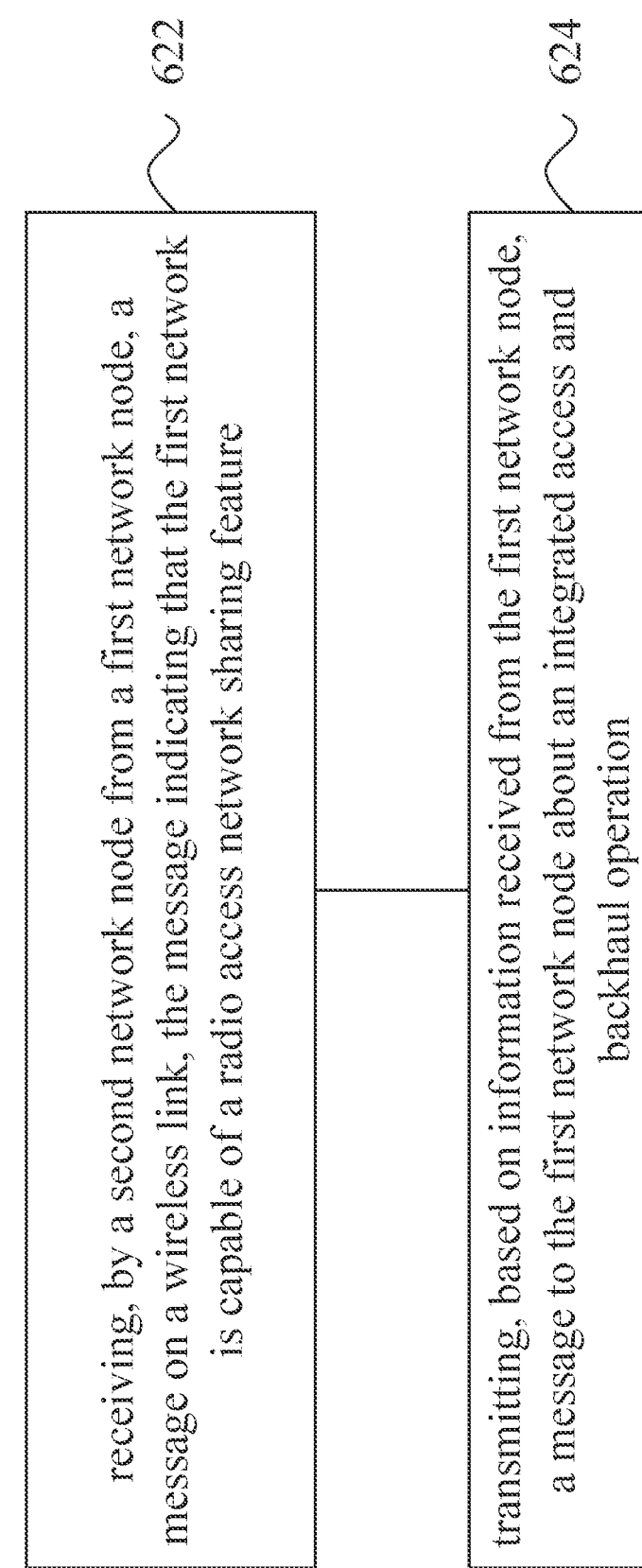

10. A method of wireless communication (e.g., method 620 depicted in FIG. 6C), comprising: receiving (622), by a second network node from a first network node, a message on a wireless link, the message indicating that the first network is capable of a radio access network sharing feature; and transmitting (624), based on information received from the first network node, a message to the first network node about an integrated access and backhaul operation.

In this solution, the first network node may be operating as an IAB node and the second network node may be a CU.

11. The method of solution 10, wherein the message comprises a list of public land mobile network (PLMN) identifiers supported by the second network device.

12. The method of solution 11, wherein the message is received via a radio resource control (RRC) message or an F1AP message.

13. The method of any of solutions 11-12, including: transmitting, by the second network node to a third network node that is operating as a donor distributed unit (DU), the list of PLMN identifiers.

14. The method of any of solutions 11-12, wherein the second network node requests internet protocol (IP) address from a third network node that is operating as a donor distributed unit (DU) on a per-PLMN basis.

The following solutions may be implemented by an IAB-node, e.g., as described with respect to Example Embodiment 2.

Figure 6D:
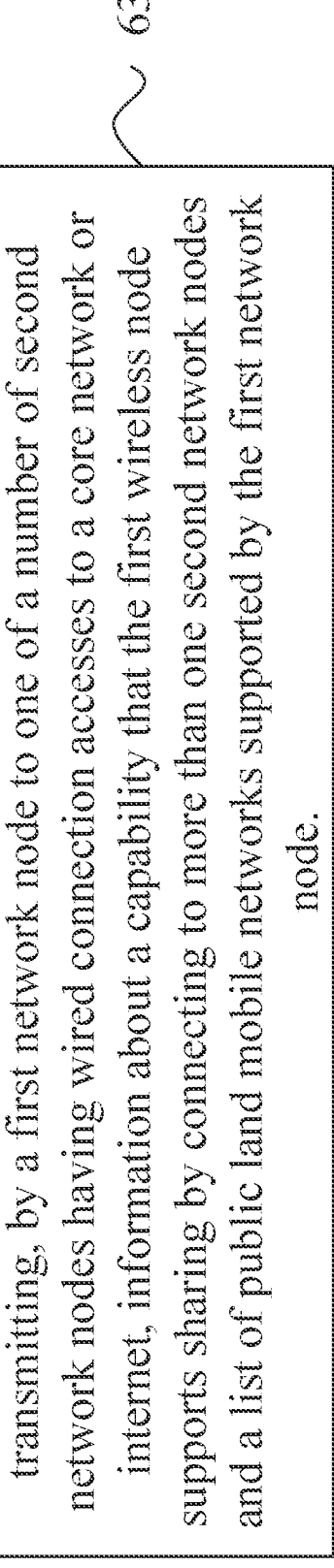

15. A method for wireless communication (e.g., method 630 depicted in FIG. 6D), comprising: transmitting (632), by a first network node to one of a number of second network nodes having wired connection accesses to a core network or internet, information about a capability that the first wireless node supports RAN sharing by connecting to other second network nodes and a list of public land mobile networks supported by the first network node.

16. The method of solution 15, wherein the information is transmitted as a radio resource control (RRC) message.

The following solutions may be implemented by CU1, e.g., as described with respect to Example Embodiment 2.

17. A method of data communication (e.g., method 640 depicted in FIG. 6E), comprising: receiving (642), by a second network node having a central capability to connect to a core network or internet, a capability information that a first network node is capable of connecting to other network nodes having the central capability, and a list of public land mobile networks supported by the first network node; and communicating (644), by the second network node to a third network node in the other network nodes a message about operation of an integrated access and backhaul (IAB) network.

As previously described, measurement reports may be used for the communicating (644) operation.

In this solution, central capability may refer to a network node's ability to be configured as a CU in an IAB.

In this solution, the first network node may be operating as an IAB node and the second network node may be a CU.

18. The method of solution 17, including: sending, by the second network node to the third network node, an IAB-node indication, e.g., of the first network node.

19. The method of solution 17, including: forwarding, by the second network node, a message received on a first interface in a container format over a second interface to the third network node in another container format.

20. The method of any of solutions 17-19, including: communicating, by the second network node to the third network node, a number of candidate synchronization signal block transmission configurations (STC) of shared cells, communicating, by the second network node to the third network node, IAB STC information received from the first network node. The latter may be performed when only CU1 has received the IAB STC information.

21. The method of any of solutions 17-18, including: communicating, by the second network node to the third network node, a number of candidate base station distributed unit (GNB-DU) resource configurations of shared cells.

22. The method of solution 20 or 21, wherein the communicating further includes communicating a configuration for providing wireless connectivity to a network node or a wireless device.

23. The method of solution 22, wherein the communicating further includes communicating an index of a configuration for providing wireless connectivity to a network node or a wireless device.

24. The method of solution 17, including: exchanging information between the second network node and the third network node about delivery of F1-C traffic via an Xn interface.

25. The method of any of solutions 17-24, including: configuring, by the second network node, the first network to encapsulate F1-C traffic to or from the third network node in an F1-AP message.

26. The method of solution 17, including: receiving, by the second network node from the first network node, a capability indication that the first network node is capable of encapsulating F1-C traffic to or from the third network node in an F1-AP message; and forwarding, from the second network node to the third network node, F1-C data from the first network node on an Xn interface based on the capability indication.

The following solutions may be implemented by a CU, e.g., as described with respect to CU2 in Example Embodiment 2.

Figure 6F:
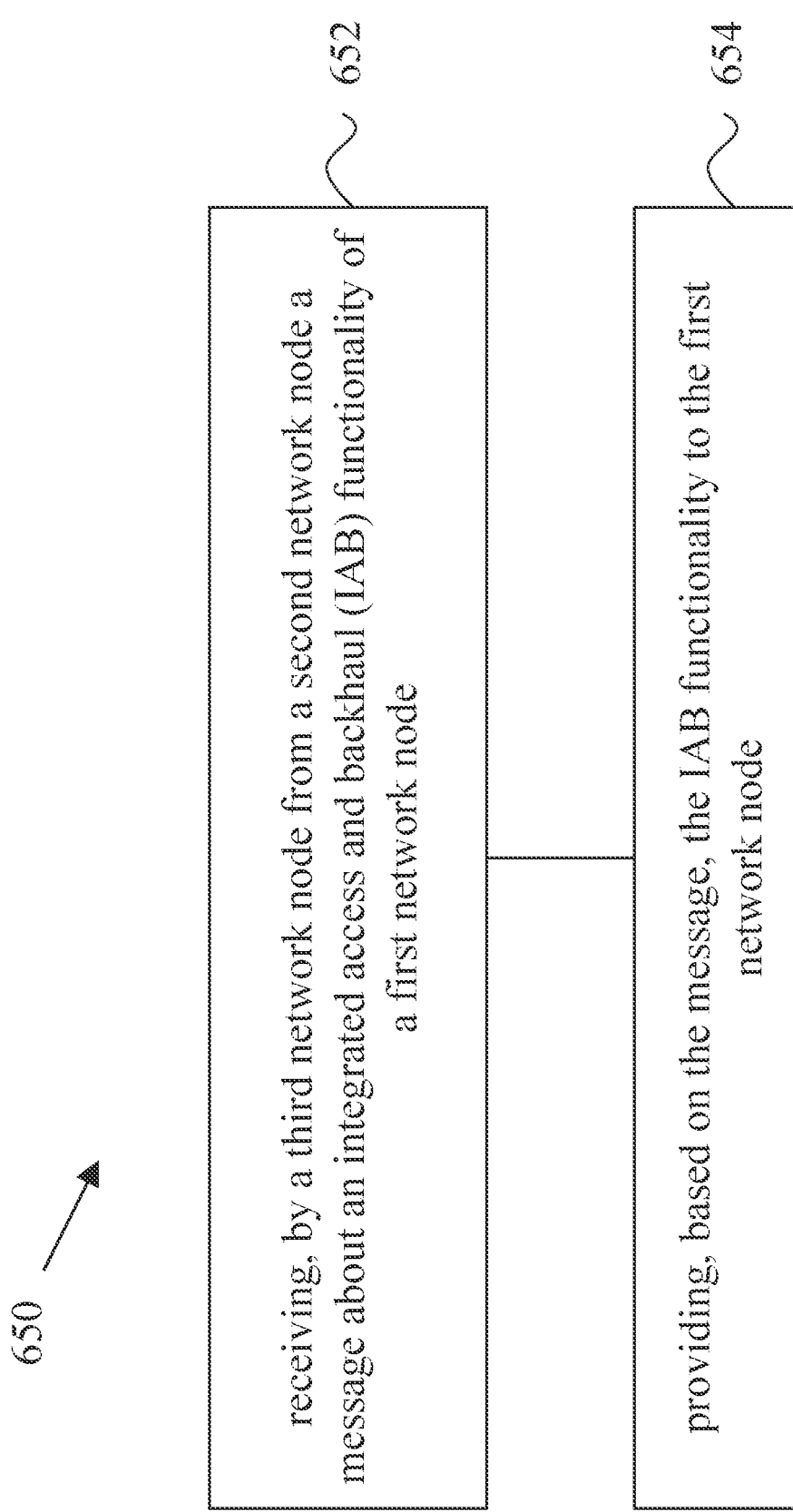

27. A method of wireless communication (e.g., method 650 depicted in FIG. 6F), comprising: receiving (652), by a third network node from a second network node a message about an integrated access and backhaul (IAB) functionality of a first network node, and providing (654), based on the message, based on the message, connectivity to the first network node.

As described in Embodiment 2, in some cases, the message may be based on a result of measurement performed on the channel between the third and second network node.

In this solution, the first network node may be operating as an IAB node and the second network node may be a CU.

28. The method of solution 1, wherein the message is received on an Xn interface.

29. The method of solution 27, including: receiving, by the third network node from the second network node, a message received on a first interface of the second network node over a second interface to the third network node, wherein the message is in a second format that is different from a first format on the first interface.

30. The method of any of solutions 27-29, including: receiving, by the third network node from the second network node, a number of candidate synchronization signal block transmission configurations (STC) of shared cells.

31. The method of any of solutions 27-28, including: receiving, by the third network node from the second network node, a number of candidate base station distributed unit (GNB-DU) resource configurations of shared cells.

32. The method of solution 30 or 31, wherein the receiving further includes receiving indexes for providing wireless connectivity to a network node or a wireless device.

33A. The method of any of solutions 1-6, including: transmitting, by the third network node, to the second network node, resource configuration of a cell that is serving a public land mobile network supported only by the third network node.

33B. The method of any of solutions 32-33, including: selecting, a configuration from a number of candidates; and sending the configuration or an index to the configuration to the second network node via an Xn interface; wherein the configuration comprises an IAB STC or a resource configuration.

The following solutions may be implemented by an IAB-node, e.g., as described with respect to Example Embodiment 3.

Figure 6G:
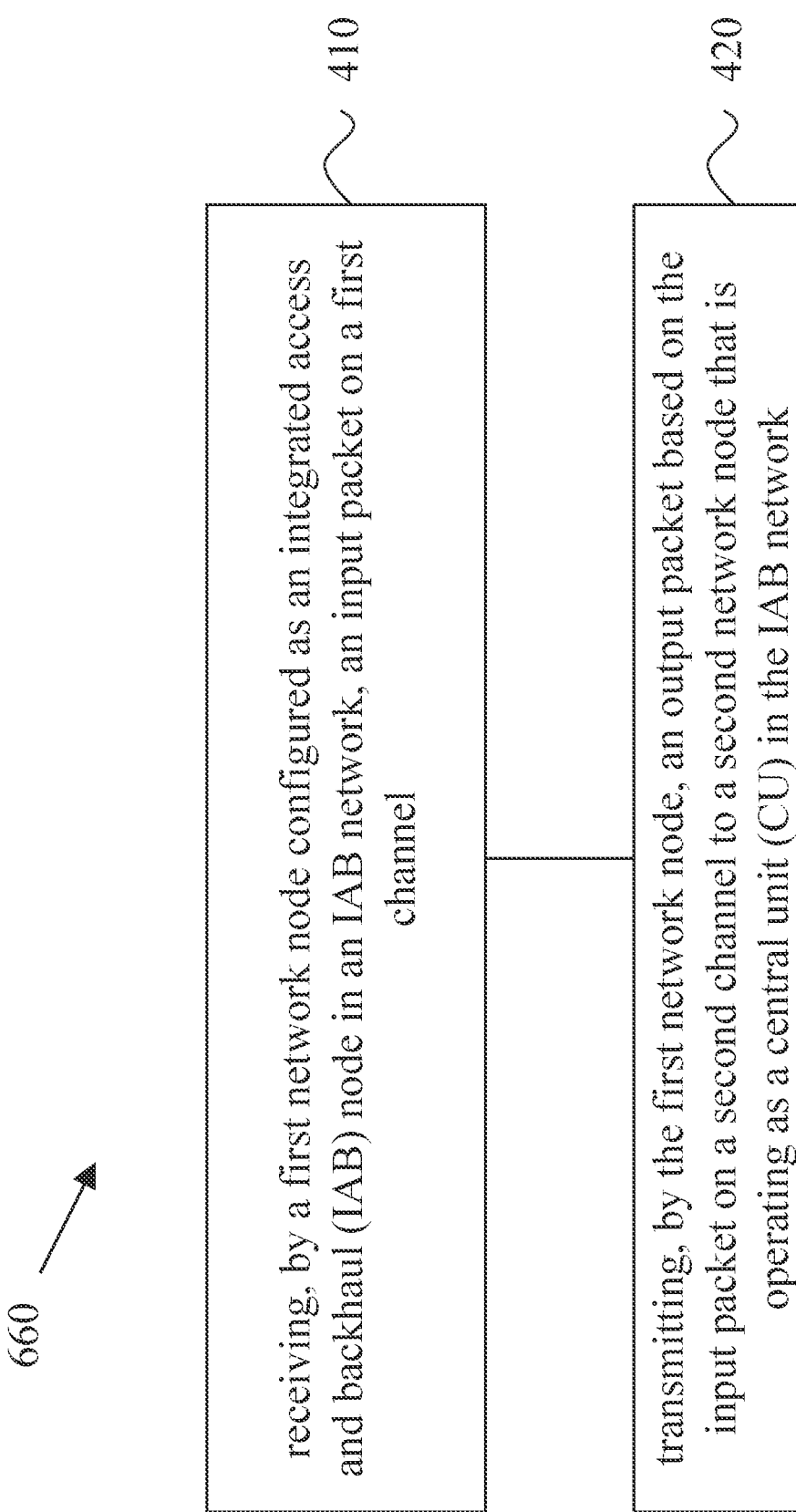

34. A method of wireless communication (e.g., method 660 depicted in FIG. 6G), comprising: receiving (662), by a first network node configured as an integrated access and backhaul (IAB) node in an IAB network, an input packet on a first channel; and transmitting (664), by the first network node, an output packet based on the input packet on a second channel to a second network node that is operating as a central unit (CU) in the IAB network.

35. The method of solution 34, wherein the first network node is couple to the second network node through a first distributed unit (DU) that implements a backhaul protocol and a second (DU) that is without the backhaul protocol, the method including: transmitting, from the first network node to a second network node, a capability indicating that the first network node is capable of transmitting and receiving F1 traffic and forwarded traffic with the second network node via the second DU.

36. The method of any of solutions 34-35, wherein use of the second channel to transmit and receive F1 traffic and forwarded traffic is based on a configuration received by the first network node from the second network node.

37. The method of any of solutions 35-36, including: transmitting, from the first network node to the second network node, F1-C traffic generated by the first network node by encapsulating into a first radio resource control message to the second DU.

38. The method of any of solutions 35-36, including: receiving, by the first network node from the second DU, F1-C traffic for the first network node from the second network node, wherein the F1-C traffic is encapsulating into a second radio resource control message.

39. The method of any of solutions 34-36, wherein the output packet is obtained from the input packet by decapsulating the input packet. For example, the packet may be decapsulating into an internet protocol (IP) packet.

40. The method of solution 37, wherein the input packet is decapsulated to determine the output packet according to information in a header field.

41. The method of solution 38, wherein the information in the header field corresponds to a backhaul adaptation protocol address of the first network node.

42. The method of solution 38, wherein the information in the header field indicates a transmission type used for transmission of control plane packets.

43. The method of solution 38, wherein the rule specifies that all output packets are transmitted over the second channel in case that the input packet carries control plane (CP) data.

44. The method of solution 34, wherein the rule specifies that the second channel is selected based on a characteristic of the control plane (CP) data carried by the input packet.

45. The method of solution 42, wherein the characteristic of the input packet corresponds to a traffic priority of the carried CP data.

46. The method of solution 42, wherein the characteristic of the input packet corresponds to a hop count of the input packet.

The following solutions may be implemented by a DU that does not implement BAP, e.g., as described with respect to Example Embodiment 3.

Figure 6H:
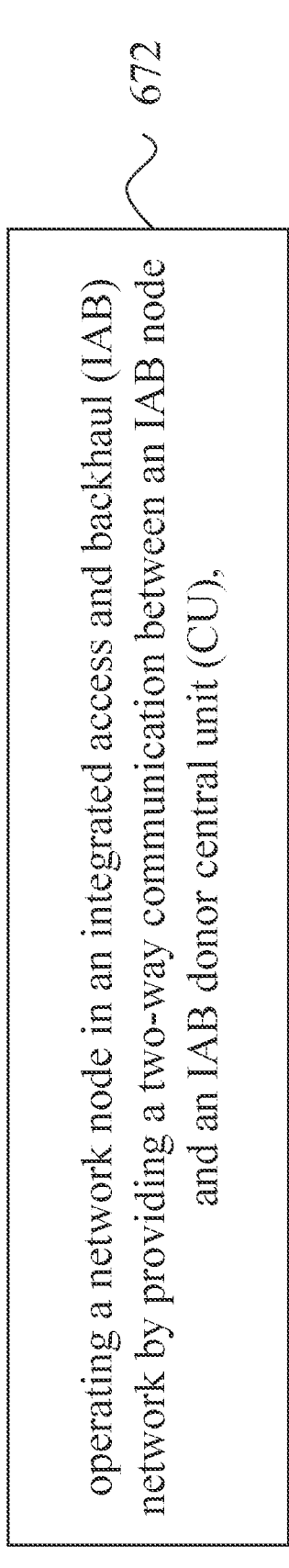

47. A method of wireless communication (e.g., method 670 depicted in FIG. 6H), comprising: operating (672) a network node in an integrated access and backhaul (IAB) network by providing a two-way communication between an IAB node and an IAB donor central unit (CU), wherein the network node receives a first encapsulated F1-C traffic from the IAB node as a radio resource control (RRC) message and forwards to the IAB donor CU as a first F1AP message; and wherein the network node receives a second F1AP message from the IAB donor CU and forwards to the IAB node as a second RRC message.

48. The method of solution 47, wherein the network node is a base station that is configured to operate without supporting a backhaul access protocol.

The following solutions may be implemented by a CU, e.g., as described for a donor CU with respect to Example Embodiment 3.

49. A method of wireless communication (e.g., method 680 depicted in FIG. 6I), comprising: receiving (682), by a second network node that is configured as a central unit (CU) of an integrated access and backhaul (IAB) network, a message from a first network node that is operating as an IAB node indicating that the first network node is able to communicate with the second network node using an output channel via a first distributed unit (DU) that implements a backhaul protocol or via a second (DU) that is without the backhaul protocol; and transmitting (684), by the second network node to the first network node, a configuration information regarding selecting between using the first DU or the second DU for communication to the second network node.

50. The method of solution 49, including receiving, via the output channel, a packet comprising control plane (CP) data that is routed through the first DU or the second DU according to the configuration.

51. A communications apparatus comprising a processor and a transceiver, wherein the processor is configured to read code from the memory and implement a method recited in any of solutions 1 to 49.

52. A computer program product comprising a computer-readable program medium code stored thereupon, the code, when executed by a processor, causing the processor to implement a method recited in any of solutions 1 to 49.

In the present document, the term "connected" refers to a communicative connection over a communication channel and need not indicate a physical connection unless otherwise noted. The term "supports" may describe that a given apparatus is configured to operate according to a particular feature or protocol or implements the particular feature or protocol or is capable of operating without errors in a particular network configuration.

It will be appreciated that the present document discloses techniques that can be implemented by network nodes to solve various technical problems in wireless IAB networks. One example technical solution relates to how various network nodes are able to support multiple RANs by communicating information about the capability. Another example technical solution may be used to achieve CP and UP separation in a CU and BAP and non-BAP capable donor DUs being used to communicate traffic to and from an IAB node and the CU.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

The invention claimed is:

1. A method for wireless communication, comprising:

receiving, by a first network node over a wireless link from a parent node of the first network node, system information including identifications (IDs) of public land mobile networks (PLMNs) supported by central units (CUs) that are connected to the parent node;

transmitting, by the first network node over the wireless link to a second network node, a first message indicating that the first network node supports the PLMNs; and requesting, by the first network node, an internet protocol (IP) address on a per-public land mobile network basis from the second network node, the requesting informing the second network node a requested number of IP addresses, a version of the IP address, and a usage of the IP address, and wherein the first network node is an integrated access and backhaul mobile termination (IAB-MT) node, the second network node is a central unit (CU), and the first message includes the IDs of the PLMNs, wherein the IP address requested by the first network node corresponds to one of the PLMNs supported by the first network node such that a packet containing a traffic belonging to a corresponding PLMN is encapsulated with the IP address, and wherein PLMNs supported by the second network node cover the PLMNs supported by the first network node.

2. The method of claim 1, including:

receiving, by the first network node from the second network node, a second message indicative of public land mobile networks supported by the second network node.

3. The method of claim 2, wherein the second message is an RRC message or an F1AP message.

4. The method of claim 1, wherein the first message is a radio resource control (RRC) message.

5. An apparatus for wireless communication comprising at least one processor configured to:

receive, from a parent node of the apparatus over a wireless link, system information including identifications (IDs) of public land mobile networks (PLMNs) supported by central units (CUs) that are connected to the parent node;

transmit to a second network node over the wireless link, a first message indicating that the apparatus is capable of a radio access network sharing feature, wherein the apparatus is an integrated access and backhaul mobile termination (IAB-MT) node and wherein the second network node is a central unit (CU); and request an internet protocol (IP) address on a per-public land mobile network basis from the second network node, the requesting informing the second network node a requested number of IP addresses, a version of the IP address, and a usage of the IP address, wherein the at least one processor causes the apparatus to operate as an integrated access and backhaul mobile termination (IAB-MT) node, the second network node is a central unit (CU), and the first message includes the IDs of the PLMNs, wherein the IP address requested by the apparatus corresponds to one of the PLMNs supported by the apparatus such that a packet containing a traffic belonging to a corresponding PLMN is encapsulated with the IP address, and wherein PLMNs supported by the second network node cover the PLMNs supported by the apparatus.

6. The apparatus of claim 5, wherein the at least one processor is further configured to receive, from the second network node, a second message indicative of public land mobile networks supported by the second network node.

7. The apparatus of claim 6, wherein the second message is an RRC message or an F1AP message.

8. The apparatus of claim 5, wherein the first message is a radio resource control (RRC) message.

9. A non-transitory computer-readable medium having code stored thereupon, the code, upon execution by at least one processor, causing the at least one processor to operate as a first network node and implement a method comprising:

receiving, from a parent node of the first network node over a wireless link, system information including identifications (IDs) of public land mobile networks (PLMNs) supported by central units (CUs) that are connected to the parent node;

transmitting, to a second network node over the wireless link, a first message indicating that the first network node is capable of a radio access network sharing feature, wherein the first network node is an integrated access and backhaul mobile termination (IAB-MT) node and wherein the second network node is a central unit (CU); and requesting an internet protocol (IP) address on a per-public land mobile network basis from the second network node, the requesting informing the second network node a requested number of IP addresses, a version of the IP address, and a usage of the IP address, wherein the first network node is an integrated access and backhaul mobile termination (IAB-MT) node, the second network node is a central unit (CU), and the first message includes the IDs of the PLMNs, wherein the IP address requested by the first network node corresponds to one of the PLMNs supported by the first network node such that a packet containing a traffic belonging to a corresponding PLMN is encapsulated with the IP address, and wherein PLMNs supported by the second network node cover the PLMNs supported by the first network node.

10. The non-transitory computer-readable medium of claim 9, wherein the code further causes the at least one processor to receive, from the second network node, a second message indicative of public land mobile networks supported by the second network node.

11. The non-transitory computer-readable medium of claim 10, wherein the second message is an RRC message or an F1AP message.

12. The non-transitory computer-readable medium of claim 9, wherein the first message is a radio resource control (RRC) message.

* * * * *